United States Patent [19]

Hageman et al.

[11] Patent Number: 5,522,107
[45] Date of Patent: Jun. 4, 1996

[54] RETAINING ARRANGEMENT FOR AN INFLATABLE MEMBER IN A DOCK LEVELER

[75] Inventors: Martin P. Hageman, Mequon; Donald G. Roth, Germantown, Wis.

[73] Assignee: Kelley Company, Inc., Milwaukee, Wis.

[21] Appl. No.: 381,080

[22] Filed: Jan. 31, 1995

[51] Int. Cl.$^6$ .................................................. E01D 1/00
[52] U.S. Cl. .............................................. 14/69.5; 14/71.7
[58] Field of Search ............................ 14/71.1, 71.2, 14/71.5, 71.7, 69.5; 254/1, 89 H, 89 R, 93 HP

[56] References Cited

U.S. PATENT DOCUMENTS

| | | |
|---|---|---|
| 2,495,092 | 1/1950 | Cox et al. . |
| 2,610,824 | 9/1952 | Grier . |
| 2,804,118 | 8/1957 | Bayerkohler . |
| 3,012,804 | 12/1961 | Jeavons . |
| 3,117,332 | 1/1964 | Kelley et al. . |
| 3,211,425 | 10/1965 | Greulich et al. . |
| 3,521,861 | 7/1970 | Freudenthal et al. . |
| 3,528,118 | 9/1970 | Smith . |
| 3,659,899 | 5/1972 | Phillips et al. ......................... 298/22 R |
| 3,711,157 | 1/1973 | Smock ...................................... 298/8 R |
| 4,012,804 | 3/1977 | Catlett ........................................ 14/71.3 |
| 4,081,874 | 4/1978 | Artzberger ................................ 14/71.7 |
| 4,293,969 | 10/1981 | Frommelt ................................. 14/71.7 |
| 4,343,058 | 8/1982 | Loblick .................................... 14/71.7 |
| 4,572,579 | 2/1986 | Saito ....................................... 298/1 A |
| 4,688,760 | 8/1987 | Garman et al. ....................... 254/93 HP |
| 4,786,032 | 11/1988 | Garman et al. ....................... 254/93 HP |
| 4,955,923 | 9/1990 | Hageman ................................. 14/71.7 |
| 5,042,103 | 8/1991 | Megens ................................... 14/71.7 |

FOREIGN PATENT DOCUMENTS

| | | |
|---|---|---|
| 0386850 | 9/1990 | European Pat. Off. . |
| WOA9313267 | 7/1993 | WIPO . |

*Primary Examiner*—Ramon S. Britts
*Assistant Examiner*—Pamela A. O'Conner
*Attorney, Agent, or Firm*—Michael, Best & Friedrich

[57] ABSTRACT

A dock leveler includes a ramp movable between a raised position and a lowered position in response to selective inflation of an inflatable member disposed between the ramp and a support located below the ramp, and an improved mounting arrangement for securing the airbag in position below the ramp. The improved mounting arrangement includes a flap extending from the airbag, which preferably consists of extended portions of the airbag walls extending outwardly from an edge defined by one or more internal airbag cavities. The flap is folded and preferably sealed about a rod, and a clamping arrangement is engageable with the flap between the rod and the airbag internal cavities for securing the airbag to a mounting surface, such as a surface defined by the support with which the airbag is engageable. The clamping arrangement includes a clamp bar having a clamping member engageable with the airbag, a spacer mounted at an end of the clamp bar opposite the clamping member, and a series of threaded members such as bolts extending between the clamp bar and the support for removably securing the clamp bar to the support.

15 Claims, 1 Drawing Sheet

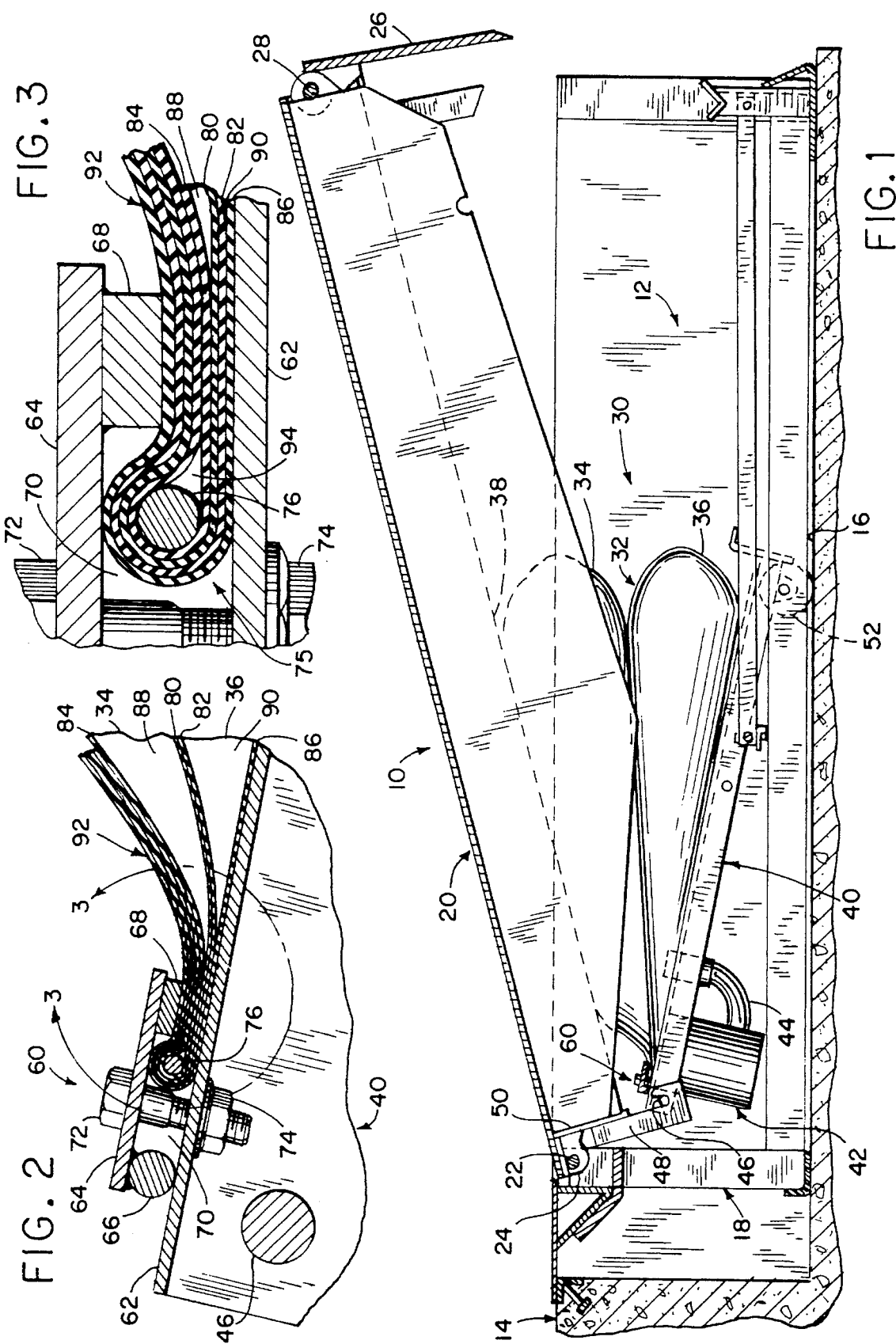

RETAINING ARRANGEMENT FOR AN INFLATABLE MEMBER IN A DOCK LEVELER

BACKGROUND AND SUMMARY OF THE INVENTION

This invention relates to a dock leveler, and more particularly to a dock leveler having an inflatable member for moving the dock leveler ramp from a lowered position to a raised position in response to selective inflation of the inflatable member.

Recent developments in dock levelers have involved placing an inflatable member, such as in the form of an airbag, below the ramp of the dock leveler for moving the ramp to its raised position from its lowered position in response to inflation of the airbag. The assignee of the present application is the owner of several pending applications directed to airbag-operated dock levelers, as follows: Ser. No. 08/131,981 filed Oct. 4, 1993 and entitled "Bag Construction For A Dock Leveler"; Ser. No. 08/250,650 filed May 27, 1994 and entitled "Dock Leveler Incorporating An Inflatable Bag"; Ser. No. 08/131,983 filed Oct. 4, 1993 and entitled "Improved Support And Attachment Mechanism For A Dock Leveler Lift Bag"; and Ser. No. 08/131,988 filed Oct. 4, 1993 and entitled "Support Mechanism For A Dock Leveler Lift Bag".

It is an object of the present invention to provide an improved arrangement for removably mounting an inflatable member, such as an airbag, to a mounting surface associated with a dock leveler. It is a further object of the invention to provide an inflatable member retaining system which is simple in its components and construction, yet which provides highly satisfactory and advantageous mounting of the inflatable member to the mounting surface. Yet another object of the invention is to provide an inflatable member mounting arrangement which involves relatively slight modifications to known construction of an inflatable member such as an airbag. A still further object of the invention is to provide a unique method of constructing an inflatable member which facilitates mounting of the inflatable member to a mounting surface.

In accordance with one aspect of the invention, a mounting arrangement for the inflatable member of a dock leveler includes a longitudinal seal formed between a pair of walls of the inflatable member for defining a boundary of an internal cavity of the inflatable member, which receives air therewithin to inflate the inflatable member. The inflatable member walls are preferably defined by sheet-like members, each of which includes external portions located exteriorly or outwardly of the seal from the internal cavity. The external portions of the sheet-like members overlie each other, and cooperate to define an external tab or flap forming an extension of the inflatable member exteriorly of the internal cavity. A clamping arrangement is engageable with the external flap defined by the inflatable member and with an inflatable member mounting surface of the dock leveler, for clamping the flap to the inflatable member mounting surface, to mount the inflatable member thereto. A rod-like member is secured to the external flap of the inflatable member, and is located outwardly of the seal. The clamping arrangement advantageously includes a longitudinal clamp bar having a clamping surface engageable with the flap at or outwardly of the seal, and the rod-like member is located outwardly of the clamping surface. The clamp bar includes a recess within which the rod-like member is received along with portions of the flap wrapped about the rod-like member, between the clamp bar and the inflatable member mounting surface. One or more threaded members are engageable with the clamp bar and with structure defining the inflatable member mounting surface, for use in selectively moving the clamping surface into clamping engagement with the external flap of the inflatable member. The clamping arrangement further includes a spacer member engageable with the inflatable member mounting surface for spacing the clamp bar thereabove. The one or more threaded members are located between the spacer member and the clamping surface, so that the spacer member functions as a fulcrum to tighten the clamping member. The rod-like member is secured to the external flap by wrapping the flap about the rod-like member. The flap is then preferably bonded to the inflatable member walls inwardly of the rod-like member to capture the rod-like member.

The invention further contemplates a method of forming an inflatable member by placing a pair of sheet-like members in overlying relation, bonding the sheet-like members together to define an edge of an internal cavity between the sheet-like members such that external portions of the sheet-like members define a flap located outwardly of the edge, and wrapping the flap about the elongated rod-like member. The step of wrapping the flap about the elongated rod-like member is carried out by placing the rod-like member on the flap, and folding the flap about the rod-like member such that the flap overlies the bonded area of the sheet-like members. As summarized above, the inflatable member can then be secured to an inflatable member mounting surface, such as a surface associated with a dock leveler.

The invention further contemplates a method of securing an inflatable member to an inflatable member mounting surface of a dock leveler, substantially in accordance with the foregoing summary, and also contemplates a dock leveler incorporating an inflatable member mounted to an inflatable member mounting surface, as summarized above.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a side elevation view, partially in section, showing a dock leveler having an inflatable member or airbag for moving the ramp to its raised position, and incorporating the airbag retaining system of the present invention;

FIG. 2 is an enlarged partial sectional view of the airbag retaining system of FIG. 1; and FIG. 3 is a further enlarged partial sectional view of a portion of the airbag retaining system, with reference to encircled area 3—3 of FIG. 2.

DETAILED DESCRIPTION OF THE PREFERRED EMBODIMENT

Referring to FIG. 1, a dock leveler 10 is mounted within a pit 12 of a loading dock 14. Pit 12 defines a forwardly sloping pit floor 16, and dock leveler 20 includes a frame assembly 18 located toward the rearward end of pit 12 to which a ramp 20 is pivotably mounted at its rearward end via pivot pins 22 extending through lugs 24 mounted to the underside of ramp 20. Pivot pins 22 extend through aligned openings formed in lugs 24 and in the upper ends of vertical rear members of frame 18.

At the forward end of ramp 20, a lip 26 is pivotally mounted via pivot pins 28 for movement between an inoperative, pendant position, as shown in FIG. 1, and an operative extended position (not shown) in which lip 26 extends outwardly from and forms an extension to the forward end of ramp 20. Lip 26 is movable from its pendant position to its operative position upon downward movement of ramp 20 toward the bed of a truck or the like parked adjacent dock 14, in a manner as is known.

To raise ramp 20 to its raised position of FIG. 1 from its lowered position, a lifting mechanism 30 is mounted below ramp 20 within pit 12. Lifting mechanism 30 includes an airbag assembly 32 having an upper bag 34 and a lower bag 36, which bear between an engagement surface 38 provided below ramp 20, and a support assembly 40. A fan assembly 42 is mounted to support assembly 40 and includes a pipe 44 which communicates pressurized air from the discharge of fan assembly 42 to the interior of lower bag 36, for providing selective inflation of bag assembly 32 upon operation of fan assembly 42.

Support assembly 40 is removably mounted to ramp 20 by means of a transverse mounting shaft 46, located at the rearward end of support assembly 40, being received within an upwardly facing slot or recess defined by hook or bracket members 48 mounted to and extending downwardly from a rear angle member 50 of ramp 20. Support assembly 40 is engageable with pit floor 16 via wheels 52 rotatably mounted toward the forward end of support assembly 40.

The above construction of dock leveler 10 is generally as set forth in co-pending applications Ser. No. 08/250,650 filed May 27, 1994 and entitled "Dock Leveler Incorporating An Inflatable Bag"; Ser. No. 08/131,983 filed Oct. 4, 1993 and entitled "Improved Support And Attachment Mechanism For a Dock Leveler Lift Bag; Ser. No. 08/131,988 filed Oct. 4, 1993 and entitled "Support Mechanism For A Dock Leveler Lift Bag"; Ser. No. 08/380,956 filed Jan. 31, 1995 and entitled "Improvements In A Dock Leveler In Which The Ramp Is Raised And Lowered Using An Inflatable Member"; and Ser. No. 08/381,083 filed Jan. 31, 1995 and entitled "Dock Leveler Having A Ramp Movable To A Raised Position By Inflation Of An Inflatable Member With A Filler For Occupying Volume Within The Inflatable Member", the disclosures of which are hereby incorporated by reference. In addition, the construction of airbag assembly 32 is set forth in detail in co-pending application Ser. No. 08/131,981 filed Oct. 4, 1993 entitled "Bag Construction For A Dock Leveler", the disclosure of which is also incorporated by reference.

Introduction of air into lower airbag 36 by operation of fan assembly 42 functions to simultaneously inflate upper airbag 34 and lower airbag 36 via openings establishing communication therebetween. Such inflation of airbag assembly 32 functions to raise ramp 20 to its raised position of FIG. 1. Subsequent lowering of ramp 20, under its own weight when operation of fan assembly 42 ceases, results in extension of lip 26 for engagement with the truck bed in preparation for loading or unloading the truck by traveling on ramp 20 between dock 14 and the truck bed. Upon departure of the truck, ramp 20 returns to a lowered position under its own weight, and lip 26 returns to its pendant position.

In accordance with the invention, an arrangement for removably securing airbag assembly 32 to support assembly 40 is shown generally at 60, for removably mounting airbag assembly 32 to one or more upper plates 62 forming a part of support assembly 40.

As shown in FIG. 2, airbag securing arrangement 60 includes a clamp bar 64 which extends substantially the entire length of the rear edge of airbag assembly 32, terminating short of the side edges of support assembly 40 at either side of dock leveler 10. A spacer bar 66 is welded to the underside of clamp bar 64 toward its rearward edge, and a clamping member 68 is welded to the underside of clamp bar 64 toward its forward end. Clamp bar 64, spacer bar 66 and clamping member 68 cooperate to define a downwardly facing recess 70, which faces toward the upper surface of plate 62. A series of bolts, such as shown at 72, extend through aligned openings formed in clamp bar 64 and in plate 62, and a nut such as 74 is engaged with the threaded shank of each bolt 72.

Airbag securing arrangement 60 further includes a longitudinal protrusion, shown generally at 75, located at the rearward end of airbag assembly 32 and received within the forward portion of recess 70 between bolts 72 and clamping member 68. In a manner to be explained, a retaining rod 76 is secured to bag assembly 32 at its rearward end, and forms a part of protrusion 75.

As set forth in co-pending application Ser. No. 08/131,981 filed Oct. 4, 1993, bag assembly 32 is constructed by first placing a pair of sheet-like members formed of any satisfactory air-impervious material, such as fabric coated with a thermoplastic resin or any other satisfactory material, in overlying relation and then bonding the contiguous walls of the members together via a peripheral heat seal defining an enclosed area within which openings are formed. The sheet-like members are then folded over onto themselves in opposite folds, and the opposite side edges and the rear edges of the folded sheet-like members are then bonded together, again such as by heat sealing, to define upper and lower airbags 34, 36. As shown in FIGS. 2 and 3, the contiguous portions of the overlying sheet-like members define lower wall 80 of upper airbag 34 and upper wall 82 of lower airbag 36. The folded portions of the sheet-like members define upper wall 84 of upper airbag 34 and lower wall 86 of lower airbag 36. The portions of walls 80, 84 and 82, 86 are then sealed together rearwardly of internal cavities 88, 90, in the vicinity below clamping member 68 (FIG. 3).

The openings formed in the enclosed area defined by the peripheral seal of the contiguous walls 80, 82 establish communication between internal cavities 88 and 90.

The sheet-like members from which walls 80–86 are formed are substantially coextensive outwardly of internal cavities 88, 90, and define an external flap, shown generally at 92. Flap 92 consists of four layers comprising the end portions of the sheet-like members from which airbags 34 and 36 are constructed, which essentially are extensions of walls 80–86 located outwardly of internal cavities 88, 90.

Rod 76, which is substantially coextensive with the width of airbag assembly 32, is secured to the rearward end of airbag assembly 32 by wrapping flap 92 about rod 76 after walls 80–86 are sealed together, so as to capture rod 76 within a space 94 defined at the fold of flap 92 about rod 76. Flap 92 can then be bonded or otherwise sealed to upper wall 84 at the previously-bonded area of walls 80–86 defining the rearward edges of internal cavities 88, 90, so as to capture rod 76 within space 94 and to securely retain rod 76 in position at the rearward end of airbag assembly 32.

Rod 76, in combination with the portions of flap 92 located below and above rod 76, define protrusion 75 at the rearward end of airbag assembly 32 which is received within the forward portion of recess 70 between clamping member 68 and bolts 72.

Clamping member 68 engages flap 92 over the sealed or bonded area of flap 92 and walls 80–86, which is located rearwardly of airbag internal cavities 88 and 90. With this arrangement, clamp member 68 engages a "dead" external area of airbag assembly 32 at its rearward end, providing a positive clamping force located outwardly of cavities 88, 90.

As can be appreciated, spacer 66 acts as a fulcrum upon tightening of bolts 72 due to the offset of bolts 72 from spacer 66, such that tightening of bolts 72 forces clamping member 68 downwardly against the upper surface of flap 92 to clamp the portion of flap 92 folded onto itself against the upper surface of plate 62.

Spacer 66 and clamping member 68 are sized so as to provide a height of recess 70 sufficient to receive the height of longitudinal protrusion 75 formed at the rearward end of airbag assembly 32 by rod 76 and the portions of flap 92 folded about rod 76. Preferably, as shown in the drawings, spacer 66 and clamping member 68 are sized so as to provide engagement of the bottom surface of clamping bar 64 with the portion of flap 92 overlying rod 76, to slightly compress the portions of flap 92 folded about rod 76.

As can also be appreciated, clamping member 68 defines a shoulder facing protrusion 75. In this manner, even if clamping bar 64 is not completely tightened down, engagement of the shoulder defined by clamping member 68 with protrusion 75 would function to retain the protrusion within recess 70.

Various alternatives and embodiments are contemplated as being within the scope of the following claims particularly pointing out and distinctly claiming the subject matter regarded as the invention.

We claim:

1. An inflatable member retaining arrangement for a dock leveler including a ramp movable between a raised position and a lowered position and having an inflatable member interposed between the ramp and a support for moving the ramp to its raised position from its lowered position, comprising:

a longitudinally extending seal formed between a pair of walls forming a part of the inflatable member for defining a boundary of an internal cavity for receiving air therewithin to inflate the inflatable member, the walls defining external portions located exteriorly of the seal from the internal cavity;

a removable clamping arrangement engageable with the inflatable member and with an inflatable member retaining surface for clamping the inflatable member to the inflatable member retaining surface; and a rod-like member secured to the external portions of the walls and located outwardly of the seal.

2. The retaining arrangement of claim 1, wherein the clamping arrangement comprises a longitudinally extending clamp bar having a clamping surface engageable with the inflatable member at or outwardly of the seal.

3. The retaining arrangement of claim 2, wherein the rod-like member is located outwardly of the clamping surface.

4. The retaining arrangement of claim 3, wherein the clamping arrangement further comprises one or more threaded members engageable with the clamp bar and with structure defining the inflatable member retaining surface for use in selectively moving the clamping surface into clamping engagement with the inflatable member.

5. The retaining arrangement of claim 4, further comprising a spacer member mounted to the clamp bar and engageable with the inflatable member retaining surface for spacing the clamp bar thereabove, wherein the one or more threaded members are located between the spacer member and the clamping surface.

6. The retaining arrangement of claim 1, wherein the rod-like member is secured to the external portions of the walls by wrapping the external portions about the rod-like member.

7. The retaining arrangement of claim 6, wherein the external portions of the walls wrapped about the rod-like member are disposed between the inflatable member retaining surface and a clamping surface defined by a longitudinally extending clamp bar forming part of the clamping arrangement.

8. The retaining arrangement of claim 7, wherein the external portions of the walls are clamped by the clamping surface over the seal.

9. In a dock leveler including a ramp movable to a raised position from a lowered position in response to inflation of an inflatable member, the inflatable member defining an edge forming a boundary of an internal cavity into which air is introduced for inflation of the inflatable member, a method of securing the inflatable member to an inflatable member mounting surface associated with the dock leveler, comprising the steps of:

wrapping an external portion of the inflatable member outwardly of the edge from the internal cavity about a rod-like member; and clamping the inflatable member to the inflatable member mounting surface by engaging a clamping member with the support and with the inflatable member between the rod-like member and the edge.

10. A dock leveler, comprising in combination:

a ramp movable between a raised position and a lowered position;

an inflatable member defining an internal cavity into which air is introduced for selective inflation thereof to raise the ramp to its raised position from its lowered position, the inflatable member having at least one edge defining a boundary of an internal cavity;

a rod-like member secured to the inflatable member externally of the internal cavity;

an inflatable member mounting surface; and a clamping member engageable with the inflatable member and with the inflatable member mounting surface, the clamping member being engageable with the inflatable member inwardly of the rod-like member for clamping the inflatable member to the inflatable member mounting surface.

11. In a dock leveler including a ramp movable to a raised position from a lowered position in response to inflation of an inflatable member having an internal cavity defining an edge, the dock leveler including an inflatable member mounting surface, the improvement comprising:

an external portion of the inflatable member extending exteriorly of the edge, the external portion being folded onto itself outwardly of the internal cavity; and a clamping arrangement including a clamping surface for clamping the folded external portion of the inflatable member outwardly of the edge between the clamping surface and the inflatable member mounting surface.

12. The improvement of claim 11, further comprising a rod-like member interconnected with the folded external portion of the inflatable member.

13. The improvement of claim 12, wherein the rod-like member is interconnected with the folded external portion of the inflatable member by folding the external portion of the inflatable member about the rod-like member prior to clamping the external portion of the inflatable member to the inflatable member mounting surface.

14. The improvement of claim 12, wherein the clamping arrangement includes a clamp bar having a recess located outwardly of the clamping surface for receiving the rod-like member and the folded external portion of the inflatable member.

15. The improvement of claim 14, wherein the clamping arrangement further includes one or more threaded fasteners extending through the clamp bar and engageable with structure defining the inflatable member mounting surface for use in clamping the external portion of the inflatable member to the inflatable member mounting surface.

* * * * *